United States Patent [19]

Hwang et al.

[11] 4,146,694
[45] Mar. 27, 1979

[54] METHOD OF POLYMERIZATION

[75] Inventors: Yu-Tang Hwang, Clinton, Iowa; Howard L. Grimmett, Lincolnshire, Ill.

[73] Assignee: Chemplex Company, Rolling Meadows, Ill.

[21] Appl. No.: 830,410

[22] Filed: Sep. 6, 1977

Related U.S. Application Data

[62] Division of Ser. No. 674,450, Apr. 7, 1976.

[51] Int. Cl.² .......................... C08F 4/02; C08F 4/24; C08F 4/78; C08F 10/00
[52] U.S. Cl. .................................... 526/96; 526/104; 526/123; 526/130; 526/154; 526/172; 526/352
[58] Field of Search ................. 526/96, 104, 123, 130, 526/154, 172

[56] References Cited

U.S. PATENT DOCUMENTS

| | | | |
|---|---|---|---|
| 3,740,384 | 6/1973 | Ballard et al. | 260/94.9 C |
| 3,756,998 | 9/1973 | Karapinka | 260/88.2 R |
| 3,844,975 | 10/1974 | Karol | 252/430 |
| 3,953,413 | 4/1976 | Hwang et al. | 526/350 |
| 4,016,343 | 4/1977 | Hoff et al. | 526/96 |
| 4,035,561 | 7/1977 | Hoff et al. | 526/96 |
| 4,041,224 | 8/1977 | Hoff et al. | 526/96 |
| 4,053,437 | 10/1977 | Liu et al. | 526/96 |
| 4,071,673 | 1/1978 | Hwang | 526/123 |

Primary Examiner—Alan Holler
Attorney, Agent, or Firm—Wegner, Stellman, McCord, Wiles & Wood

[57] ABSTRACT

A catalyst and the method of making same and a method of making polymers of 1-olefins with said catalyst in which the catalyst is prepared by chemically modifying a finely divided, difficultly reducible, inorganic support of the nature of silica, alumina, thoria, titania, magnesia and mixtures thereof by adding to the support a zirconium compound before dispersing on the modified support a chromium chelate derived from a beta-dicarbonyl compound that may be either acyclic or cyclic, the chelate being essentially of the formula

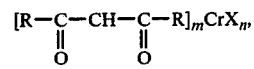

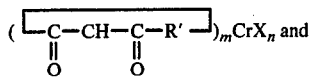

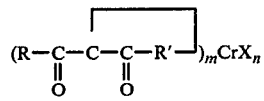

wherein R is individually selected from hydrogen, alkyl, alkenyl, aryl, cycloalkyl and cycloalkenyl radicals and combinations of these radicals with each R containing 0–20 carbon atoms and a corresponding valence-satisfying number of hydrogen atoms, R' is selected from alkylene, alkenylene, arylene, cycloalkylene and cycloalkenylene radicals and combinations of these bivalent radicals with R' containing 1–20 carbon atoms and a corresponding valence-satisfying number of hydrogen atoms, m is a whole number of 1 to 3, n is a whole number of 0 to 2 and m plus n is 2 or 3 and X is an inorganic or organic negative group (relative to chromium) such as halide, alkyl, alkoxy and the like, followed by activating by heating to and at an elevated pyrolytic temperature of about 800°–2000° F. in a nonoxidizing (either inert or reducing) atmosphere. Typical compounds are chromium acetylacetonate, chromium benzoylacetonate, chromium 5,5-dimethyl-1,3-cyclohexanedionate, chromium 2-acetylcyclohexanonate, and the like.

16 Claims, No Drawings

METHOD OF POLYMERIZATION

This is a division of application Ser. No. 674,450, filed Apr. 7, 1976.

BACKGROUND OF THE INVENTION

This invention pertains to catalysts for polymerizing or copolymerizing olefinic compounds and especially ethylene and other 1-olefins having a total of 2 to 8 carbon atoms and the copolymerization of these with 1-olefins containing from 2 to 20 carbon atoms, to methods of preparing the catalysts and to methods of making these polymers and copolymers.

DESCRIPTION OF THE PREFERRED EMBODIMENTS

In accordance with this invention, polymerizable olefinic compounds, and especially 1-olefins of 2–8 carbon atoms, are polymerized or copolymerized with $C_2$-$C_{20}$ olefins to form solid polymers and copolymers in the presence of novel catalysts which consist essentially of low-valent chromium surface species, as an active ingredient, dispersed and supported on at least one difficult to reduce inorganic oxide, preferably having reasonable surface area, modified by the addition of a zirconium compound. The low-valent chromium species are derived from a chromium chelate of a beta-dicarbonyl compound of which chromium acetylacetonate is a good example by its interaction with the catalyst support and/or thermal decomposition under a substantially oxygen free atmosphere, for example one that is inert such as nitrogen or reducing such as carbon monoxide.

The inorganic oxide support may be silica, alumina, thoria, magnesia, titania or mixtures and composites thereof resulting from coprecipitation, impregnation, vapor-phase deposition, etc. Surface area of the support may range from a few $m^2/g$ to over 700 $m^2/g$ but preferably above 150 $m^2/g$. Pore volume is preferably in excess of 0.5 cc/g if surface area is primarily related to micropores. A finely divided non-porous support with relatively high surface area such as "Cab-O-Sil" may also be used with this invention. Activation of the catalyst by pyrolysis at elevated temperatures of preferably about 800°–2000° F. is accomplished either in a fluid bed maintained by the flow of non-oxidizing gas or in a stationary bed under high vacuum, provided optionally with a small leak-in of non-oxidizing gas.

The chromium acetylacetonate may be regarded as a derivative of 2,4-pentanedione. Due to its chelating structure, six coordination sites of the central chromium are effectively occupied. The related chromium compounds suitable for this invention include virtually all chromium derivatives of a beta-diketone, a beta-keto aldehyde or a beta-dialdehyde of the formula

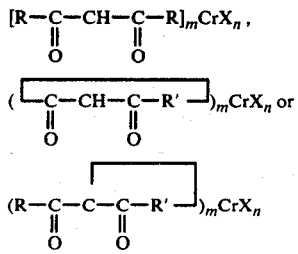

wherein R is individually selected from hydrogen, alkyl, alkenyl, aryl, cycloalkyl and cycloalkenyl radicals and combinations of these radicals with each R containing 0–20 carbon atoms and a corresponding valence-satisfying number of hydrogen atoms, R' is selected from alkylene, alkenylene, arylene, cycloalkylene and cycloalkenylene radicals and combinations of these bivalent radicals with R' containing 1–20 carbon atoms and a corresponding valence-satisfying number of hydrogen atoms, m is a whole number of 1 to 3, n is a whole number of 0 to 2 and m plus n is 2 or 3 and X is an inorganic or organic negative group (relative to chromium) such as halide, alkyl, alkoxy and the like. For example, in addition to chromium acetylacetonate, one may use chromium benzoylacetonate, chromium 5,5-dimethyl-1,3-cyclohexanedionate, chromium 2-acetylcyclohexanonate and the like.

The chromium in the chelate of this invention has a valence of three. The new catalysts are dark black if properly activated according to the method of this invention.

In preparing the catalysts of this invention, the following procedures are involved, some of which are optional as indicated. These procedures are the petreatment by heating of the support (optional but normally preferred), the modifying of the support with the zirconium compound, the dispersing of the chromium chelate on the support and the activation of the supported catalyst by heating in a non-oxidizing atmosphere.

Pretreatment of the Support

The purpose of pretreatment is to adjust the moisture content of the support. The pretreatment may be carried out in a fluidized bed with any dry non-reactive gas such as air or nitrogen. Alternately, the pretreatment may be carried out in a stationary bed such as in a muffle furnace. Pretreatment in the fluidized bed is preferable to the calcination in the muffle furnace especially if temperatures are above 800° F. The optimum pretreatment temperature is dependent on the support type and its physical properties and may range from 400° F. to 2000° F. Effects of residual moisture or other volatiles on the course of activation are not yet fully understood.

Modifying the Support with Zirconium

The support is modified by treatment with a zirconium compound which most conveniently is a zirconium salt of an organic or an inorganic acid and may be applied either in the form of an aqueous or solvent solution or by applying the zirconium compound, dry, preferably in a fluidized bed using a non-reactive gas as the fluidizing gas.

In general, the zirconium compounds applicable for modifying of the support according to this invention are compounds which are soluble in water or organic solvents, zirconium compounds which can be vaporized and zirconium compounds which react chemically with the base. These include organic and inorganic zirconium salts as well as zirconium chelates.

As a zirconium source soluble or relatively low-melting (or low-boiling) zirconium compounds, such as $ZrCl_4$, $ZrO(NO_3)_2$, zirconium acetate, zirconium acetylacetonate, etc. may be used. Depending on the zirconium compound being used, its dispersion on the silica support may be accomplished by either impregnation or dry coating. In case of impregnation, an aqueous solution is generally preferred, but a non-aqueous solution may also be used with or without predrying the silica base. For the dry coating, it is generally preferable to carry it out in the fluidized bed at elevated temperatures, with or without predrying the silica base, but it may also be done in the stationary bed at elevated temperatures, and optionally under vacuum. The silica support thus modified is normally calcined at 400°–2000° F., being especially preferred, in air or in nitrogen. The effects of this calcination on the activated catalyst cannot be generalized, but appears to be dependent on the zirconium compound used. For example, $ZrO(NO_3)_2$-modified silica tends to yield a catalyst of low to negligible activity if the calcination is done below 800° F. while at higher calcination temperatures, for example 1200° F., good catalyst activity is obtained. Silica, for example, having a surface area of 50–1000m$^2$/g may tolerate as high as 10 wt.% zirconium. In this invention a range of 0.5–5 wt.% is preferred. These are, of course, by weight of the support.

The modifying of the support, and especially silica, with the zirconium gives higher activity and better melt index/synthesis temperature relationships in ethylene polymerization, for example. The zirconium compound which is conveniently in the form of a salt may be a zirconium halide such as a zirconium tetrachloride or zirconyl nitrate or a mixture of halide and nitrate. It has been found, for example, that a mixture of zirconium tetrachloride and zirconyl nitrate gives a better color than zirconium tetrachloride alone and better catalyst activity than zirconyl nitrate. Another useful zirconium compound is zirconium acetylacetonate. Other typical zirconium compounds are zirconium acetate, preferably in an amount of from about 0.5–1 wt.% of the support, and zirconium nitrate at, for example, 1 wt.%. The support modified with the chloride gave the highest melt index when used for ethylene polymerization with the nitrate giving only slightly lower MI.

The modification of the support by the pretreatment with the zirconium compound produces the following improved results:

1. It enhances the polymerization activity of the catalyst.
2. It prolongs rather dramatically the shelf life of the activated catalyst.
3. It increases thermal stability of the catalyst and permits higher activation temperatures to be used.
4. It produces polyethylene having higher melt index under comparable polymerization conditions.

Dispersion of the Chromium Chelate on the Support

The dispersion of the chromium chelate of this invention on the support can be readily accomplished by a conventional impregnation method using organic solvents such as toluene or benzene. Equally satisfactory dispersion is often achieved by a more convenient method which calls for dry-blending of the chelate with the support and effecting the final dispersion during the initial stage of activation. If such a dry-blending technique is used, the subsequent activation is best carried out in the fluid bed operation. The optimum chromium content of the catalyst is dependent on the support type, surface area and pore structure. In this invention the support can have a surface area of 100–800 m$^2$/g or greater and pore volume of 0–3.0 cc/g, the chromium level may range from 0.05 to 5% with the preferred level somewhere around 0.1–1.0 weight percent on the dry basis.

Activation under Non-Oxidizing Atmosphere

In accordance with this invention the non-oxidizing atmosphere is provided either by inert gas such as nitrogen, helium, argon, etc., by a reducing gas such as carbon monoxide, hydrogen, etc., or by evacuation to a sufficiently high vacuum. In the latter case, it is desirable to permit deliberate leak-in of a small amount of non-oxidizing gas. In all cases, a mixture of non-oxidizing gases may be used, if desired.

The pyrolytic activation is carried out under either fluid-bed or stationary-bed conditions but fluid-bed operation is preferable. Normally, for economic reasons, flowing nitrogen is used to fluidize the catalyst in an activator. The temperature is raised to the final pyrolytic activation temperature according to a preselected cycle which normally calls for a 1 to 3 hour hold at 300°–350° F. and again at 550°–600° F. When chromium acetylacetonate is used in the preparation of the catalyst, these two temperature ranges appear to correspond to the completion of two stages of interaction between the chromium acetylacetonate and the support. However, it is possible to obtain active catalysts using other activation temperature programs.

The final activation temperatures may range from 800° F. to 2000° F. depending on such factors as desired resin properties, support type, pretreatment, etc. In the case of a zirconium modified silica support and chromium acetylacetonate, the activation temperatures are preferably between 1400° and 1850° F. The heat-up rate above 600° F. is generally not critical.

The activating of the catalyst at the temperature to and at a temperature of about 800°–2000° F. produces a pyrolytic reaction in that it causes wheat evidence indicates to be a chemical uniting of the modified support and the chromium chelate followed by pyrolytic decomposition of the resulting chromium species bound to the support.

Novel catalysts of this invention may be used in liquid-phase, solution or slurry processes or vapor-phase processes. In the liquid-phase operation any $C_3$-$C_{12}$ saturated hydrocarbon may be used as a reaction medium or diluent. Other types of solvents, including aromatic hydrocarbons and chlorinated solvents, may also be used. The polymerization of the 1-olefins may be carried out in batch or continuous process. The catalyst is generally charged into the reactor as a slurry in the continuous process, but as dry powder in the batch process. The mode of charging the solvent and olefin to the reactor system may follow any conventional practice applicable to batch or continuous operation, respectively. A vigorous agitation of the reaction medium is of course greatly preferred and so is the provision for efficient cooling to control the reactor temperature.

The olefin polymer or copolymer is normally recovered by flashing off the solvent or diluent without any intervening steps for removal of the catalyst. The activity of the novel catalysts described in this invention is normally high enough so that catalyst removal steps can be omitted for all practical purposes. In the case of ethylene, pressures may range from atmospheric to 30,000 psig and temperatures from 150° F. to 500° F.

The following examples are from both bench-scale polymerization experiments (1 through 6) and pilot plant-scale continuous polymerization runs (7 through 14). In order to provide an overall view of these examples, the objectives of each example and certain features of catalyst preparation are summarized as follows:

EXAMPLE 1

Illustrates a typical preparation of the basic catalyst as disclosed in our application Ser. No. 478,879. filed June 13, 1974, now Pat. No. 3,953,413 and assigned to the assignee hereof.

EXAMPLE 2

Illustrates a typical procedure for modifying silica with $ZrCl_4$ using aqueous impregnation, followed by calcination. This example also demonstrates the enhanced activity and improved shelf life of the Zr-modified catalyst.

EXAMPLE 3

Demonstrates the use of $ZrO(NO_3)_2$ (zirconyl nitrate) in the modification of the silica support. Improvement in catalyst activity was observed as compared to Example 1.

EXAMPLE 4

Shows that a Zr-modified catalyst can be activated in a reducing atmosphere (a mixture of nitrogen and hydrogen). The example also shows the calcination at higher temperatures,1550° F. vs. typical 1200° F.

EXAMPLE 5

In conjunction with Examples 1 and 13 this example shows that the optimum activation temperatures are around 1600° F. for the catalyst without Zr-modification.

EXAMPLE 6

In conjunction with Examples 2, 8 and 14 shows that the optimum activation temperatures for the Zr-modified catalyst are around 1700°-1750° F. This is some 100°-150° F. higher than the unmodified catalyst.

EXAMPLES 7-10

As a group demonstrate that a Zr-modified catalyst is more active and produces polymer giving a higher melt index than the unmodified catalyst under comparable operating conditions.

EXAMPLE 11

Shows the effects of higher calcination temperatures on melt index and activity.

EXAMPLE 12

Shows the effects of higher calcination temperatures and lower activation temperatures on melt index and activity.

EXAMPLES 13 & 14

In conjunction with Examples 5, 6 and 8 demonstrates that Zr-modification improves the thermal stability of the catalyst and permits higher activation temperatures. This makes the catalyst system of this invention quite flexible.

Description of the Batch Reactor Experimental Procedure

The ethylene polymerization activity of a given catalyst was tested in a bench-scale reactor using isobutane as the reaction medium. The reactor, an autoclave 5"I.D. and about 12" deep, was equipped with an agitator rotating at 560 rpm, a flush bottom valve, and three ports for charging catalyst, isobutane and ethylene, respectively. The reactor temperature was controlled by a jacket containing methanol which was kept boiling by an electric heater encircling the jacket. The control mechanism involved the automatic adjustment of jacket pressures in response to either cooling or heating requirements.

In accordance with a general test procedure, the reactor was first thoroughly purged with ethylene at a temperature around 200° F., followed by the transfer of 0.05-0.5 g catalyst from a catalyst flask under nitrogen into the reactor via a transfer tube without exposing it to air. After the catalyst charge port was closed, 2900 ml isobutane (dried and de-oxygenated) was charged into the reactor, trapped ethylene was vented, and the reactor was allowed to warm up to 225° F. The reactor was then pressurized with ethylene which was regulated at 550 psig and permitted to flow into the reactor whenever the reactor pressure dropped below 550 psig. An instantaneous flow rate of ethylene was monitored by rotameters of various capacity. The duration of a test run was normally from 40 minutes to four hours depending on the polymerizaion rate.

At the end of a test run, ethylene flow was cut off, the flush bottom valve was opened, and the reactor content was dumped into a recovery pot, approximately 5" I.D. and 10" deep, where isobutane was allowed to flash off through a 200-mesh screen into the vent. Polymer particles left in the pot were recovered and weighed.

EXAMPLE 1

A catalyst was prepared by the following steps:

(1) About 10 pounds of Davison 952 MS-ID silica was dried in a pilot plant scale activator, essentially a 12" I.D. by 30" long cylinder equipped with a gas dispersing plate and encircling electrical heater. The actual drying was accomplished by fluidizing the silica with 100 SCFH of nitrogen and heating to 1300° F. and holding at this temperature for five hours.

(2) 30.0 grams of this pre-dried silica was impregnated with an organic solution containing 1.519 g chromium acetylacetonate dissolved in 100 ml toluene. Solvent was subsequently evaporated at 85°-140° F. by nitrogen sweep until the catalyst became free flowing.

(3) About 15 grams of this catalyst was then charged into a catalyst activator consisting of a 38mm O.D., 27-inch long Vycor glass tube and tubular electric heater. A fritted disc was provided in the midsection of the tube. In this example a fluid bed was maintained by approximately 400 cc/min nitrogen flow. The activation cycle consisted of (a) hold at 250° F. for one-half hour, (b) hold at 350° F. for one hour, (c) hold at 550° F. for one hour, (d) raising 200° F. every 15 minutes up to 1600° F., (e) hold at 1600° F. for two hours, and (f) cool down to room temperature under nitrogen atmosphere.

(4) The activated catalyst of (3) was transferred to a closed flask equipped with a hose-and-clamp without exposing it to air. This step was also used in all the following examples.

0.1129 g of the activated catalyst of (4) was charged into the reactor for activity test in accordance with the general procedure described earlier. The test run lasted for 80 minutes. The polymer recovered weighed 136.5 g and had an MI of 0.52 g/10min. The average reactivity over the entire run was calculated to be 909 g/g catalyst/hour.

EXAMPLE 2

A catalyst was prepared by the following steps:

(1) 400 grams of Davison 952 MS-ID silica was impregnated with an aqueous solution prepared by dissolving 9.65 grams $ZrCl_4$ in 1200 ml demineralized water. The modified base was then dried at 230° F. in an oven equipped with mechanical convection until free flowing, followed by further drying at 400° F. for 4 hours in the same oven.

(2) The silica thus modified was then calcined in a muffle furnace by a heating cycle consisting of (a) hold at 390° F. for one hour, (b) raising 120° F. every 15 minutes up to 1200° F., (c) hold at 1200° F. for 4 hours, and (d) cool down to room temperature.

(3) 30.0 grams of this modified base was impregnated with an organic solution prepared by dissolving 1.53 gm chromium acetylacetonate in 100 ml toluene. The solvent was then evaporated as in Example 1.

(4) About 20 grams of this impregnated and partially dried catalyst of (3) was activated in nitrogen as described in Example 1 except the final hold was at 1700° F. for two hours, and heat up rate was 150° F. every 15 minutes from 550° F. to 1700° F.

The catalyst thus activated was tested in accordance with the general procedure described earlier. In this example 0.2351 gm of catalyst was used, and the run was terminated after 30 minutes. From this experiment 148.0 grams of polymer was collected having an MI of 0.39 g/10 min. The average reactivity over the entire run was calculated to be 1259 g/g catalyst/hour. After 80 days of shelf storage under nitrogen in a closed flask, this same catalyst was retested. In this retest, for a net charge of 0.1048 g of catalyst and total run time of 120 minutes, 201 g of polymer was recovered having an unmilled MI of 0.34. The average reactivity was calculated to be 959 g/g catalyst/hour. After 140 days of shelf storage under nitrogen the same catalyst was again tested for activity. For a net charge of 0.0837 g catalyst and total run time of 60 minutes, 50.0 g of polymer was recovered, corresponding to an average reactivity of 597 g/g catalyst/hour. The MI of the resin powder was 0.53 g/10 min.

EXAMPLE 3

A catalyst was prepared by the following steps:

(1) 400 grams of Davison MS-ID silica was impregnated with an aqueous solution prepared by dissolving 5.50 grams $ZrO(NO_3)_2 \cdot 2H_2O$ in 1200 ml demineralized water. The subsequent drying at 400° F. for four hours was the same as in Example 2.

(2) The modified silica of (1) was calcined in the muffle furnace by heating in a cycle consisting of (a) hold at 390° F. for one hour, (b) raising 120° F. every 20 minutes up to 1200° F., (c) hold at 1200° F. for four hours, and (d) cooling down to room temperature.

(3) 30.0 grams of this calcined $Zr(NO_3)_2$-modified silica of (2) was impregnated with an organic solution made from 1.52 grams of chromium acetylacetonate and 100 ml toluene. The solvent was subsequently evaporated as in Example 1.

(4) About 20 grams of this impregnated and partially dried catalyst of (3) was activated in nitrogen as in Example 1 except for a two hour hold at 1700° F. instead of at 1600° F.

The activity of the catalyst of (4) was evaluated by the general procedure described earlier. The net charge of catalyst was 0.0676 g and the run time was 100 minutes. Polymer weighing 135.2 grams was recovered which had an MI of 0.51 g/10 min. The average reactivity over the entire run was calculated to be 1205 g/g catalyst/hour, or 160,000 g/g.Cr/hr.

EXAMPLE 4

A catalyst was prepared by the following steps:

(1) 300 grams of 952 MS-ID silica was impregnated with an aqueous solution prepared by dissolving 3.63 g $ZrCl_4$ in 900 ml demineralized water. This modified support was subsequently dried at 400° F. for 4 hours as in Example 2.

(2) The $ZrCl_4$-modified silica of (1) was calcined in the muffle furnace as in Example 2 except for a hold at 1550° F. for 4 hours instead of 1200° F.

(3) 30 grams of the modified support of (2) was impregnated with organic solution prepared by dissolving 0.607 g chromium acetylacetonate in 92 ml toluene. The solvent was subsequently evaporated as in Example 1.

(4) The impregnated and partially dried catalyst was activated as follows:
  (a) The catalyst was fluidized in the activator, as described in Example 1, by a mixed stream of hydrogen and nitrogen, both flowing at the rate of 200 cc/min.
  (b) The activator was heated to 250° F. and held for one hour.
  (c) The bed temperature was raised to 350° F. and held for one hour.
  (d) The bed temperature was raised to 550° F. and held for one hour.
  (e) The bed temperature was then raised by 200° F. every 15 minutes up to 1000° F. where it was held for one hour.
  (f) Hydrogen flow was then cut off and nitrogen flow increased to maintain the fluid bed.
  (g) The bed temperature was raised by 200° F. every 15 minutes up to 1700° F. where it was held for two hours.
  (h) The catalyst was cooled down to room temperature under nitrogen atmosphere.

This catalyst was tested by the general procedure described earlier. In this particular case, the net charge of catalyst was 0.1612 gm and the run time was 90 minutes. From the run 62.7 grams of polymer was recovered.

EXAMPLE 5

A catalyst was prepared by the following steps:

(1) 200 grams of Davison 952 silica was calcined in a muffle furnace according to a heating cycle consisting of (a) hold at 390° F. for 2 hours, (b) raising 77° F. every 15 minutes up to 1200° F., (c) hold at 1200° F. for 3 hours and (d) cool down to room temperature.

(2) 30.0 grams of the calcined silica of (1) was impregnated with 100 ml of toluene solution containing 1.01 g of chromium acetylacetonate. The solvent was subsequently evaporated as in Example 1.

(3) About 15 grams of this impregnated catalyst was activated in nitrogen as in Exammple 1 except the final hold temperature was 1650° F. instead of 1600° F.

In accordance with the general test procedure described earlier, 0.0822 g catalyst was charged to the reactor. After 60 minutes of total run time, 6.0 grams of polymer was recovered. The average reactivity was calculated to be 73 g/g catalyst/hour or 14,600 g/g Cr/hr.

EXAMPLE 6

A catalyst was prepared as follows:

(1) About 800 grams of Davison 952 MS silica was dry-blended with 43 grams of zirconium acetylacetonate. The mixture was fluidized with 100 SCFH air flow in the pilot plant scale activator as described in Example 1. The coating of the silica with the zirconium salt was effected by heating the fluid bed to 1200° F. and holding at 1200° F. for four hours before cool down.

(2) 30.0 grams of this zirconium acetylacetonate-modified silica was impregnated with 90 ml toluene solution containing 1.53 g of chromium acetylacetonate and the solvent was evaporated as in Example 1.

(3) About 20 grams of this impregnated and partially dried catalyst was activated in nitrogen as in Example 1 except the final hold temperature was 1750° F. instead of 1600° F.

A net charge of 0.1856g catalyst was tested for activity in accordance with the general procedure described earlier. After a 60 minute run there was recovered 129 grams of polymer. The average reactivity was calculated to be 695 g/g catalyst/hour or 92,700 g/g Cr/hr, compared to 160,600 g/g Cr/hr for a similar catalyst (Zr-modified silica) activated at 1700° F. as described in Example 3.

The following examples illustrate procedures and preparations on a pilot plant scale using a continuous flow polymerization reactor.

EXAMPLE 7

A silica support having a surface area of approximately 300 m$^2$/g and a pore volume of approximately 1.7 cc/gm was used for this example. This type of material is available commercially from the Davison Chemical Company as 952 MS-ID silica gel. The catalyst of this example was prepared by drying this support at 1300° F. in a fluidized bed using nitrogen as the fluidizing gas. The apparatus used for this drying step consisted of a 4" I.D. by about 48" long tube made of Inconel metal. The tube was provided with electric heaters around the outside. The heaters were capable of heating the tube plus its contents to temperatures up to 2000° F. The bottom of the tube was fitted with a distributor plate designed to give uniform distribution of the gas entering the bottom of the tube and flowing up through the tube. A bed of regenerated molecular sieves was used to dry the nitrogen to a total moisture content of less than 2 ppm (vol) before it entered the tube. A flow measuring device to regulate the flow rate of gas through the activator tube was provided. A controller for the heating elements capable of raising the temperature of the fluidizing tube to elevated temperatures according to a predetermined cycle was also provided.

After drying at 1300° F. the base was cooled to near ambient temperature while still being fluidized with nitrogen. The dried silica was then removed from the tube with precaution being taken to prevent moisture pick-up from the atmosphere. This dried silica was then impregnated with a sufficient amount of a solution of chromium acetylacetonate in dried toluene to give a chromium concentration of 1% by weight on the total dry catalyst. The catalyst was then placed in an oven and the toluene removed by heating at about 150°-200° F. in the presence of a dry nitrogen atmosphere. Once the bulk of the toluene was removed, the dried catalyst was transferred to the fluidizing tube described above.

In this tube the catalyst was fluidized with nitrogen and heated to a temperature of 350° F. and held for 3 hours, the temperature was then raised to 550° F. and held for 3 hours, and the temperature was then raised to 1650° F. and held for 6 hours. The heat up rate between hold temperatures was about 150° F. per hour. All the while the nitrogen flow was held constant to provide fluidization of the catalyst within the heated tube. The catalyst was then cooled to approximately ambient temperature while still fluidized and was then dumped from the tube into a predried flask which had been carefully purged to eliminate all traces of oxygen and moisture from the interior of the flask. This flask was then sealed and the flask was stored in a container having a dry nitrogen environment until the catalyst was to be used in the polymerization system. The activated catalyst of this example was black in color. At a suitable time, the catalyst was charged to a continuous polymerization reactor and used to polymerize ethylene at a temperature of about 227° F. in the presence of dry isobutane and with an ethylene concentration of 5.6% by weight in the reactor.

The reactor used for the continuous polymerization tests consisted of a vessel provided with a jacket and a means for good agitation within the vessel. The volume of the vessel was about 90 gallons. Water was circulated through the jacket of the reactor to remove the heat liberated during the polymerization reaction. Means were provided to regulate the coolant temperature and the coolant flow so as to control the temperature of the reactor. Means were provided for feeding a slurry of catalyst to the reactor at a controlled rate. Means were provided for introducing a second monomer or comonomer to the reactor as well as modifying agents to control the molecular weight of the polymer formed in the reactor although these were not used in this example. Means were provided to feed a diluent separately to the reactor at a controlled rate. Means were provided to discharge a mixture of the polymer formed in the reactor, unreacted monomer and/or comonomer, and diluent from the reactor. The polymer mixture discharged from the reactor flowed to a heated flash vessel where the diluent and unreacted ethylene were removed as a vapor and the polymer was recovered with only traces of hydrocarbon. The recovered polymer was purged batchwise with inert gas to remove the traces of hydrocarbon and analyzed for melt index, density and ash. These factors are determined by standard tests well known in the industry. The test used for determining melt index is ASTM D-1238-62T and the method for measuring the density is given as ASTM D-1505. Ash was determined by a pyrolysis method. In all cases, the polymer yield figures are calculated from the ash values.

The polymer of this example had a melt index of 0.2 and a density greater than 0.960. The yield of catalyst on polymer amounted to 3200 pounds of polymer collected per pound of catalyst fed to the reactor. This data along with the data from the following examples is summarized in Table I. In all examples, isobutane was used as the diluent in the reactor system.

EXAMPLE 8

This example demonstrates the use of the zirconium modified support of this invention. The catalyst in this example was prepared using the Davison 952 MS-ID silica gel. The catalyst was prepared by dissolving zirconium tetrachloride in demineralized water and adding this solution to the silica in an amount sufficient to give a concentration of 1% by weight zirconium on the dry support. After the wet impregnation the impregnated support was dried at 230° F. until the catalyst became free flowing, and then the catalyst was dried for four hours at approximately 390° F. This zirconium modified silica base was then placed in a muffle furnace and calcined at a temperature of 1200° F. for approximately four hours. This calcined zirconium base was then impregnated with chromium acetylacetonate dissolved in dry toluene to deposit sufficient chromium acetylacetonate on the catalyst to give a concentration of 1% chromium by weight of the dry catalyst. The catalyst was then dried at mild temperatures to remove toluene after which the catalyst was placed in the fluidizing tube of Example 7 and activated at 1750° F. for six hours using dry nitrogen as the fluidizing agent. The activated catalyst was black in color. The results obtained when this catalyst was used to polymerize ethylene in the continuous polymerization unit of Example 7 are shown in Table I. As shown by comparison with Example 7, the catalyst made with the zirconium modified base is more active than an unmodified base and produced a polymer of higher melt index.

EXAMPLE 9

The catalyst used in this example was prepared in the same way as the catalyst in Example 7 except that (a) the catalyst base was not predried prior to the addition of the chromium acetylacetonate, (b) sufficient chromium acetylacetonate was added to the base to give 2% chromium on the catalyst, and (c) the maximum activation temperature was 1550° F. The catalyst was used in the continuous polymerization unit described in Example 7 to polymerize ethylene. In this example the ethylene concentration in the reactor was maintained at 3.5 weight percent and the reaction temperature was maintained at 227° F. The results obtained are summarized in Table I.

EXAMPLE 10

The catalyst used in this example was prepared in an identical manner to the catalyst used in Example 8 except that sufficient chromium acetylacetonate was added to give 2% chromium on the catalyst. The catalyst was used to polymerize ethylene in the continuous reactor unit described in Example 7. The ethylene concentration and reactor temperature were maintained at 3.5% and 227½° F., respectively. The results are summarized in Table I. As can be seen by comparing Examples 9 and 10, the catalyst prepared according to the method of this invention has significantly better activity and yields a polymer of higher melt index.

EXAMPLE 11

This example and the following example demonstrate the effect of calcination temperature and activation temperature on a catalyst made with a zirconium modified base. The catalyst of this example was prepared in the same manner as that in Example 8 except that the zirconium modified silica base was calcined at 1700° F. The results obtained when this catalyst was used to polymerize ethylene in the continuous polymerization reactor of Example 7 are shown in Table I.

EXAMPLE 12

The catalyst of this example was prepared in the same manner as the catalyst in Example 11 except that the catalyst was heated to a temperature of 1550° F. instead of a temperature of 1750° F. after the chromium acetylacetonate had been added and the toluene evaporated. When used in the continuous polymerization unit to polymerize ehtylene the results shown in Table I were obtained.

The next two examples along with Example 8 demonstrate the beneficial effects that zirconium modification of the support has on catalyst activity and the higher activation temperatures that can be used with the zirconium modified supports of this invention.

EXAMPLE 13

The catalyst of this example was prepared in an identical manner with that of Example 7 except that the Davison 952 silica was not predried at 1300° F. before the chromium acetylacetonate was added and except that an activation temperature of 1750° F. was used. When this catalyst was used in the continuous polymerization system it was found that the catalyst was inactive. It is believed that this is because the activation temperature used for the catalyst was too high. In comparison with Example 8 and Example 14 following this example demonstrates the beneficial effect that zirconium modification has in stabilizing the catalyst to permit the use of higher activation temperatures.

EXAMPLE 14

The catalyst of this example was prepared in the same manner as Example 8 except that the zirconium modified base was not calcined after drying at 328° F. and except that the chromium acetylacetonate was dry mixed with the base before activation. The activation temperature was 1850° F. instead of 1750° F. as in Example 8. When this catalyst was used in the continuous reactor the catalyst was active as shown in Table I. This demonstrates the higher activation temperature which can be used when a zirconium modified support is used with the catalyst of this invention.

Although various theories are expressed herein, the invention is not limited to any theory.

All parts and percentages herein are by weight.

Table I

| Example No. | % Cr | % Zr | Calcination or Drying Temp. ° F. | Activation Temp. ° F. | Reactor Temp. ° F. | Ethylene Conc. in Rx % Wt. | Melt Index | Catalyst Productivity lb. polymer per lb.cat |
|---|---|---|---|---|---|---|---|---|
| 7 | 1 | 0 | 1300 | 1650 | 227 | 5.6 | 0.20 | 3200 |
| 8 | 1 | 1 | 1200 | 1750 | 227 | 5.5 | 0.32 | 4800 |
| 9 | 2 | 0 | None | 1550 | 227 | 3.5 | 0.19 | 1600 |
| 10 | 2 | 1 | 1200 | 1750 | 227½ | 3.5 | 0.56 | 3900 |
| 11 | 1 | 1 | 1700 | 1750 | 226 | 4.7 | 0.12 | 2600 |
| 12 | 1 | 1 | 1700 | 1550 | 226 | 4.6 | 0.15 | 1600 |
| 13 | 1 | 0 | None | 1750 | Inactive | → | → | → |

Table I-continued

| Example No. | % Cr | % Zr | Calcination or Drying Temp. °F. | Activation Temp. °F. | Reactor Temp. °F. | Ethylene Conc. in Rx % Wt. | Melt Index | Catalyst Productivity lb. polymer per lb.cat |
|---|---|---|---|---|---|---|---|---|
| 14 | 1 | 1 | None | 1650 | 228 | 5.0 | 0.33 | 1200 |

We claim:

1. The method of making polymers of 1-olefins of 2 to 8 carbon atoms and copolymers of said olefins and 1-olefins of 2 to 20 carbon atoms which comprises polymerizing said olefins under polymerizing conditions with a catalyst prepared by (1) dispersing on a finely divided, difficultly reducible, inorganic support of the class consisting of silica, alumina, thoria, titania, magnesia and mixtures thereof a zirconium compound to provide a zirconium modified support, (2) dispersing on the support of (1) a chromium chelate of a beta-dicarbonyl compound essentially of the formula of the class consisting of

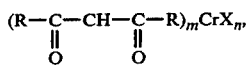

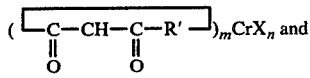

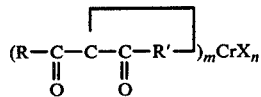

wherein each R is individually selected from hydrogen, alkyl, alkenyl, aryl, cycloalkyl and cycloalkenyl radicals and combinations of these radicals with each R containing 0–20 carbon atoms and a corresponding valence-satisfying number of hydrogen atoms, R' is selected from alkylene, alkenylene, arylene, cycloalkylene and cycloalkenylene radicals and combinations of these bivalent radicals with R' containing 1–20 carbon atoms and a corresponding valence-satisfying number of hydrogen atoms, m is a whole number from 1 to 3, n is a whole number from 0 to 2 with m plus n being a whole number of 2 to 3 and X is a negative group relative to chromium, and (3) activating the resulting mixture by heating to and at an elevated temperature of from about 800°–2000° F. in a non-oxidizing atmosphere.

2. The method of claim 1 wherein said zirconium compound is a zirconium salt.

3. The method of claim 1 wherein said dispersing of the zirconium on the support is by applying thereto a solution of the zirconium compound.

4. The method of claim 1 wherein said dispersing of the zirconium on the support is by applying thereto the dry compound and heating.

5. The method of claim 4 wherein said applying is in a fluidized bed.

6. The method of claim 1 wherein said chelate is essentially of the formula

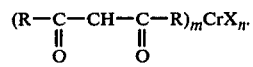

7. The method of claim 1 wherein said chelate is essentially of the formula

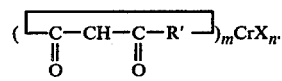

8. The method of claim 1 wherein said chelate is essentially of the formula

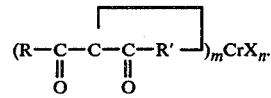

9. The method of claim 1 wherein said suport is dried by heating to a calcining temperature either before or after applying said zirconium compound.

10. The method of claim 9 wherein said calcining temperature is from about 400°–2000° F.

11. The method of claim 1 wherein said chromium chelate is dissolved in a solvent and the resulting solution used to impregnate said modified support.

12. The method of claim 1 wherein said dispersing of said chromium chelate is accomplished by dry blending with the finely divided modified support and activating by heating in a fluid bed maintained in suspension with a non-oxidizing gas flowing through the support during the heating.

13. The method of claim 1 wherein said activating is in a fluid bed using a non-oxidizing gas to maintain the mixture of modified support and chromium chelate in a fluid condition while heating to a final activation temperature of from about 800°–2000° F.

14. The method of claim 1 wherein said chromium chelate is chromium 2,4-hexanedionate which is the chromium derivative of 2,4-hexanedione.

15. The method of claim 1 wherein said chromium chelate is chromium acetylacetonate which is the chromium derivative of 2,4-pentanedione.

16. The method of claim 1 wherein said chromium chelate is chromium benzoylacetonate which is the chromium derivative of 1-phenyl-1,3-butanedione.

* * * * *